(12) United States Patent
Refai et al.

(10) Patent No.: US 7,249,189 B2
(45) Date of Patent: Jul. 24, 2007

(54) NETWORK MANAGEMENT PROGRAMMABLE CONFIGURATION MANAGEMENT FRAMEWORK

(75) Inventors: Khaled F. Refai, Nepean (CA); Syed Farhan Shahid, Nepean (CA); Satvinder Singh Bawa, Ottawa (CA)

(73) Assignee: Alcatel, Paris (FR)

( * ) Notice: Subject to any disclaimer, the term of this patent is extended or adjusted under 35 U.S.C. 154(b) by 761 days.

(21) Appl. No.: 10/338,659

(22) Filed: Jan. 9, 2003

(65) Prior Publication Data

US 2004/0139193 A1    Jul. 15, 2004

(51) Int. Cl.
G06F 15/16 (2006.01)
(52) U.S. Cl. ............... 709/230; 709/223; 709/220; 709/221
(58) Field of Classification Search ........... 709/230, 709/223, 220, 221, 222, 224; 379/15.03, 379/201.12
See application file for complete search history.

(56) References Cited

U.S. PATENT DOCUMENTS

| | | | |
|---|---|---|---|
| 6,259,679 B1 * | 7/2001 | Henderson et al. | 370/254 |
| 6,381,250 B1 * | 4/2002 | Jacobson et al. | 370/468 |
| 6,426,959 B1 * | 7/2002 | Jacobson et al. | 370/468 |
| 6,477,566 B1 * | 11/2002 | Davis et al. | 709/223 |
| 6,553,403 B1 * | 4/2003 | Jarriel et al. | 709/202 |
| 6,571,285 B1 * | 5/2003 | Groath et al. | 709/223 |
| 6,938,214 B2 * | 8/2005 | Proulx et al. | 715/763 |

* cited by examiner

Primary Examiner—Zarni Maung
Assistant Examiner—Alan Chou
(74) Attorney, Agent, or Firm—Jim Zegeer

(57) ABSTRACT

A programmable configuration management infrastructure is provided. The programmable configuration management infrastructure employs Programmable Configuration Requests (PCRs) to perform configuration management over a definable target list of field-installed managed communication equipment subject to a definable schedule and configuration management policies. The programmable configuration management infrastructure provides for monitoring of configuration command execution and traps errors. In the event of detecting configuration command execution errors, the programmable configuration management infrastructure provides for restoring the configuration either for all targets processed or for the targets experiencing errors only as specified in the PCR definition. Recourse may be made to the validation of configuration change or configuration restoration commands as specified in the PCR definition. Configuration management policies may be employed to limit configuration management to specific time frames as well the rate at which configuration commands are issued may be tailored to prevent overuse of resources. Benefits are derived from programmable configuration management functionality based on which programmable configuration applications can be built with ease while ensuring reduced configuration management overheads and error contingency processing.

4 Claims, 5 Drawing Sheets

Scheduling:
Start [yy/mm/dd-hh:mm]
End [yy/mm/dd-hh:mm]
Frequency: [ ]

Policy:
Best Time Frame:
Start [yy/mm/dd-hh:mm]
End [yy/mm/dd-hh:mm]

Target Processing Rate:
Minimum [ ]
Maximum [ ]

Job Execution Setup:
Configuration Job: [ ▽] [Browse]
Validate Job? ● Yes ○ No
Validation Job: [ ▽] [Browse]

Trap Errors? ● Yes ○ No
Stop on First Error? ● Yes ○ No
Undo on Error? ● Yes ○ No
○ Undo All? ● Undo Errors?
Undo Job: [ ▽] [Browse]
Validate Undo Job? ● Yes ○ No
Validation Undo Job: [ ▽] [Browse]

● Continue until successful?

PCR Management View Panel (Execution Control Module)

| PCR Identifier | Status | User |
|---|---|---|
| NewPCR | New | User01 |
| SetPortBuffer | InProgress | UserB2 |
| ▬▬▬ | Success | JSmith |
| ▬▬▬ | Failed | Admin. |
| ▬▬ | Stopped | ... |
| ▬▬▬ | Undo | ... |
| ▬▬▬ | Validating | ... |
| ... | ... | ... |

Buttons left side:
- 310 Create PCR
- 316 Save PCR
- 318 List PCRs
- 320 Retrieve PCR
- 721 Validate PCR
- 722 Start PCR
- 724 Stop PCR
- 728 Undo
- 726 Resume PCR Buttons right side:
- 406 Generate Target List
- 408 Set PCR Parameters
- 710 (arrow)
- 322 Delete PCR

Job Progress Reporting (Listener Module)

| Target ID | Status | Start | End |
|---|---|---|---|
| Port23 | Available | yy/mm/dd-hh:mm | yy/mm/dd-hh:mm |
| Port23 | Unavailable | | |
| Port53 | InProgress | yy/mm/dd-hh:mm | yy/mm/dd-hh:mm |
| Port4 | Success | yy/mm/dd-hh:mm | yy/mm/dd-hh:mm |
| Port67 | Failed | ... | ... |
| Port84 | Undo | ... | ... |
| Port91 | Validating | ... | ... |
| ... | ... | ... | ... |

Selected PCR Execution Status
Status: In Progress     ##% Complete
[▬▬▬▬▬▬▬▬▬▬▬▬▬▬▬▬▬▬▬▬▬▬▬▬▬]

FIG. 7    700    730

NETWORK MANAGEMENT PROGRAMMABLE CONFIGURATION MANAGEMENT FRAMEWORK

FIELD OF THE INVENTION

The invention relates to managing communication networks, and in particular to methods and systems providing controlled bulk configuration management.

BACKGROUND OF THE INVENTION

Communications networks have an infrastructure including network nodes, and interconnecting links. Typically a variety of network elements are employed, each of which provides a specialized function. Communications network nodes may include more than one network element. Data content is conveyed over the interconnecting links in accordance with multiple transport protocols, each of which addresses particular service needs.

FIG. 1 is a schematic diagram showing interconnected network elements implementing connected communications networks.

Network nodes 102, 102-A, 102-B, 106 are physically interconnected via physical links 104 in communications networks 100. Communications networks 100 may be bridged via bridge network nodes 106 to enable data content exchange therebetween. Connected communications networks 100 can be grouped defining areas of focus and influence for the purposes of network management, known as network partitions 108.

All data network equipment is subject to design choices which are bound to differ from vendor to vendor. For example, as shown schematically in FIG. 1, an equipment vendor may chose to implement an integral network node device 102-B having a switching processor and a group of ports 110. Another equipment vendor may chose a customizable implementation of a network node 102-A including: a switching fabric, an equipment rack divided into shelves, each shelf 120 having slot connectors 122 for connection with interface cards, each interface card 124 having at least one port 110.

Network management is concerned, at least in part, with monitoring managed communications network equipment to ensure adherence to a defined communications network state. Configuration management is concerned with the definition of the communications network state which includes configuring operational parameters associated with field-installed managed communications network equipment to operate in a desired fashion.

In the prior art an operator would manually configure each managed network element (equipment and/or entity). The operator would employ a vendor and network equipment specific Element Management System (EMS) to access a corresponding specific piece of field-installed network equipment, and use manual command entry to effect each desired change.

Performing such manual configurations on a large number of communications network nodes and the associated equipment is time consuming, costly, and error-prone. One of the biggest drawbacks to using the time consuming manual methods is that configuration management is to be performed within specific service time windows so as to minimally impact service provisioning. Performing large scale manual configuration management has and will continue to be a bottleneck in maintaining a high level of managed communications network reliability, availability and serviceability (RAS) as trends in the field of communications show an increasing demand for services, provided over an expanding and increasingly complex communications network infrastructure.

An improvement to the manual configuration approach includes custom script writing which enables performing specific configurations via a batch of commands in an EMS configuration management context. As a simple bulk configuration management example, a custom script may be used in configuring the size of an input buffer for each port 110 of a single vendor specific communications network node type. Using such configuration scripts reduces somewhat the time required to configure all ports 110 of a network node 102-B as the density of ports 110 per network node 102-B increases.

However, if only a subset of ports 110 needs to be configured for a network-node 102(A/B), the operator, besides using the EMS to access each network node 102(A/B), must dedicate time to manually select the ports 110 to be configured. As the number of network nodes 102 to be configured increases and the density of ports 110 per network node 102 increases to fill service demand, the time needed to select the network nodes 102 and the ports 110 also increases. Further custom command scripts must be defined for each vendor communications network equipment type as the configuration command sets may vary. Certain advancements have been proposed and implemented including: the use of the Simple Network Management Protocol (SNMP) to reduce reliance on multi-vendor EMS solutions. However the SNMP solution: is not suited for certain applications leading to an increased configuration management overhead, not widely adopted by all vendors, and/or is not implemented on all vendor communications network equipment types.

Custom command scripts are more efficient than performing the operations manually, however errors can still occur. As the scripts can be executed faster than manual command input, in an attempt to comply with the stringent time requirements imposed by management time windows, inadvertent errors in command scripts take effect, in affecting the operation of the configured equipment, at corresponding fast rates. Typical command script execution is performed without regard to errors.

Even though employing configuration scripts represents an improvement over strictly manual configuration methods, the configuration management is still limited to the EMS configuration context in which each communications network element needs to be identified and accessed, using a custom specific EMS for each communications network element.

In a Network Management System (NMS) configuration context, instances of managed entities including: network nodes 102/106 (aggregators switches, routers, bridges, gateways, etc.), interface cards 124, ports 110, paths 112, links 104, etc. hold operational parameter specifications for corresponding managed field-installed network equipment. The managed entity instances form an interconnection hierarchy defined by associations between the managed entity instances, the managed entity instances and the associations defining a containment hierarchy.

An exemplary containment hierarchy 200 of managed network entities, shown in FIG. 2, is maintained for network management purposes. Each managed network entity instance in the containment hierarchy 200 corresponds to a field-installed physical managed entity or a defined logical managed entity in the realm of influence. Exemplary physical managed entities include, but are not limited to: physical links 104, physical ports 110, interface cards 124, shelves 120, network nodes 102, routers, bridges 106, gateways, aggregators, etc. Exemplary logical managed entities include, but are not limited to: network partitions 108, link groups 204, logical trunks 206, logical ports 210, paths 112, virtual routers, etc.

As an example, typically link groups 204 are used to provide inverse multiplexing. A link group 204 is typically defined to include a group of physical links 104 used in combination to convey content at the aggregate bandwidth of the group of physical links 104. The group of physical links 104 in the link group 204 connect to a corresponding group of ports 110 associated typically with an interface card 124 providing inverse multiplexing functionality. The corresponding group of physical ports 110 define a logical port 210. In conveying content, a data flow may be routed onto a link group 204, the inverse multiplexing interface card 124 distributing the data flow bandwidth over the individual physical links 104 in the link group 204.

As another example, typically logical trunks 206 are used to provide redundant content transport. Each logical trunk 206 is typically defined to include at least one designated active physical link 104, actively used for conveying content, and at least one designated standby physical link 104, reserved to convey content in the event that the associated active physical link 104 experiences a failure. Typically the physical links 104 in a logical trunk 206 connect to physical ports 110 on different interface cards 124 to provide redundancy. The corresponding group of physical ports 110 define a logical port 210. In conveying content, a data flow may be switched to the logical port 210, the combination of interface cards 124 cooperating to direct content transport over the active physical link 104 or the standby physical link 104 dependent on the operational status of the designated active equipment (physical link 104, corresponding physical port 110, corresponding interface card 124, etc.)

An NMS 230 such as an Alcatel 5620 NMS interacts with the containment hierarchy 200 to provide an operator, typically, with a visual display of the managed communications network state. Further, the NMS 230 is used to interact with the field-installed communications network equipment either directly or indirectly via interaction with managed communication network entity instances in the containment hierarchy 200. Network management information is reported to the NMS 230 and status registers associated with the corresponding managed communications network entity instances in the containment hierarchy 200 are updated accordingly.

Current NMS 230 solutions such as the Alcatel 5620 NMS provide for centralized individual communications network entity configuration in a NMS configuration context without recourse to EMS solutions. There therefore is a need for improved centralized bulk configuration management solutions providing a high level of network reliability, availability, and serviceability (RAS).

SUMMARY OF THE INVENTION

In accordance with an aspect of the invention, a programmable configuration management framework is provided. The programmable configuration management framework makes use of a store for retrievably storing a plurality of programmable configuration requests. A scheduler inspects the store to identify at least one programmable configuration request to be serviced. A work management module, responsive to the scheduler, services the identified programmable configuration request causing a corresponding plurality of configuration commands to be issued for monitored execution to a plurality of communications network target entities. And, an event management module receives command execution feedback and informs the work management module of reported events. The work management module performs contingency processing in accordance with a corresponding programmable configuration request specification.

In accordance with another aspect of the invention, the work management module is further responsive to a policy module. The policy module enables engineered configuration management by controlling the issuance of the plurality of configuration commands to prevent the overuse of bandwidth.

In accordance with a further aspect of the invention, the programmable configuration management framework is also responsive to an execution control module associated with a human-machine interface. The execution control module enables an operator to control the execution of a programmable configuration request.

In accordance with a further aspect of the invention, a method of performing controlled configuration management is provided. Method steps include: retrieving a programmable configuration request from a store retrievably storing a plurality of programmable configuration requests, issuing a plurality of commands to effect the configuration of a plurality of communications network target entities, monitoring the execution of the issued commands, and selectively suppressing the issuing of commands on detecting command execution errors to prevent causing network failure.

In accordance with a further aspect of the invention, the method of performing controlled configuration management further provides for validating the execution of the plurality of commands.

In accordance with a further aspect of the invention, the method of performing controlled configuration management further provides for subjecting the issuance of the plurality of commands to a configuration management policy in an attempt to prevent overuse of resources.

In accordance with yet another aspect of the invention, the method includes issuing at least one configuration restoring command to undo configuration effected by previously issued commands subsequent to detecting a command execution error.

The advantages are derived from the provision of configuration command validation, configuration backtracking, and configuration command execution rate control enabling a high level of network Reliability, Availability, and Serviceability (RAS) in performing configuration management.

BRIEF DESCRIPTION OF THE DRAWINGS

The features and advantages of the invention will become more apparent from the following detailed description of the preferred embodiments with reference to the attached diagrams wherein:

FIG. 6 is another schematic diagram showing an exemplary generic view of a human-machine interface used, in accordance with the exemplary embodiment of the invention, to set parameters of a programmable configuration request; and FIG. 7 is yet another schematic diagram showing an exemplary generic view of a human-machine interface used, in accordance with the exemplary embodiment of the invention, to interact with the programmable configuration management infrastructure.

It will be noted that in the attached diagrams like features bear similar labels.

DETAILED DESCRIPTION OF THE EMBODIMENTS

Figure 2:
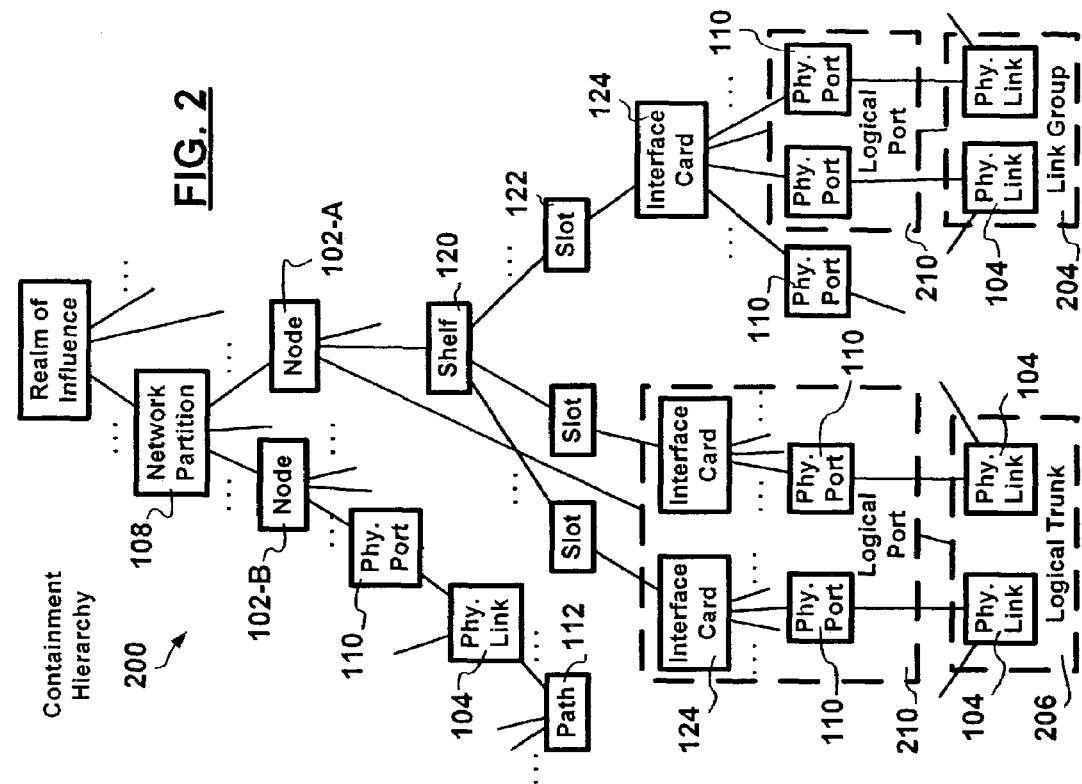
FIG. 2 is a schematic diagram showing an exemplary containment hierarchy enabling centralized network management of managed network entities.
Figure 1:
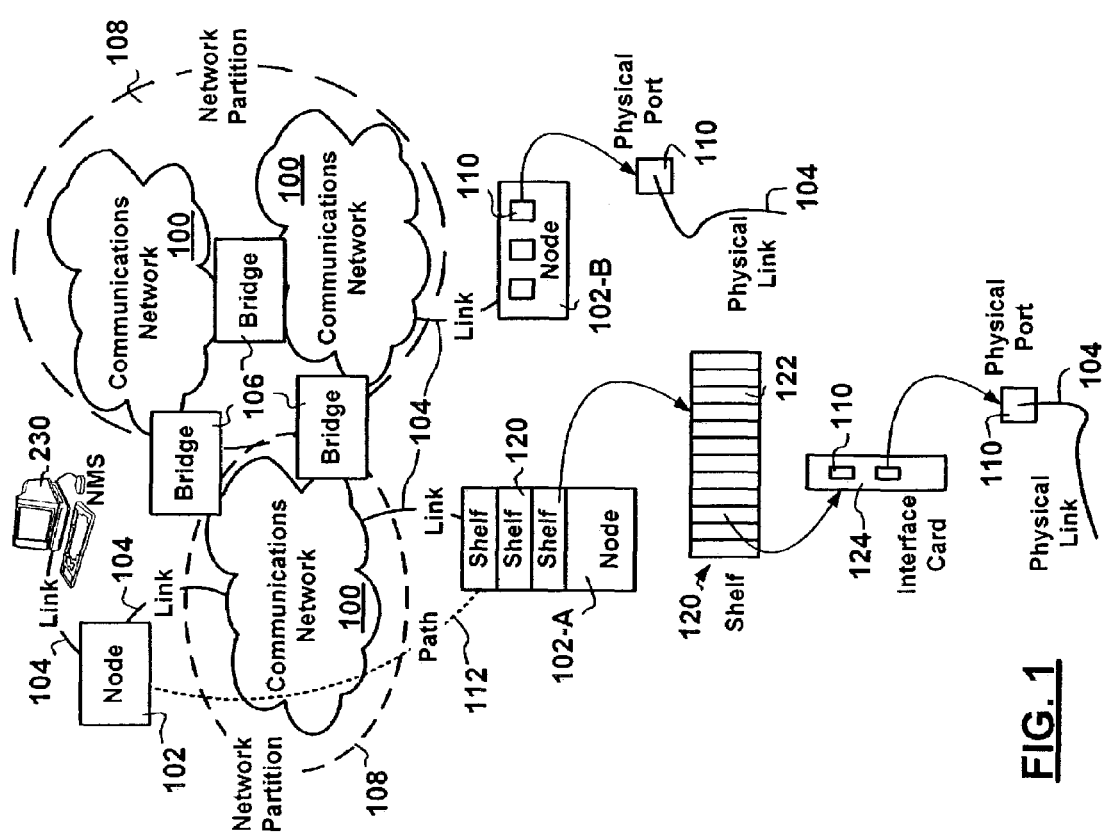
FIG. 1 is a schematic diagram showing exemplary interconnected communication network equipment.
Figure 3A:
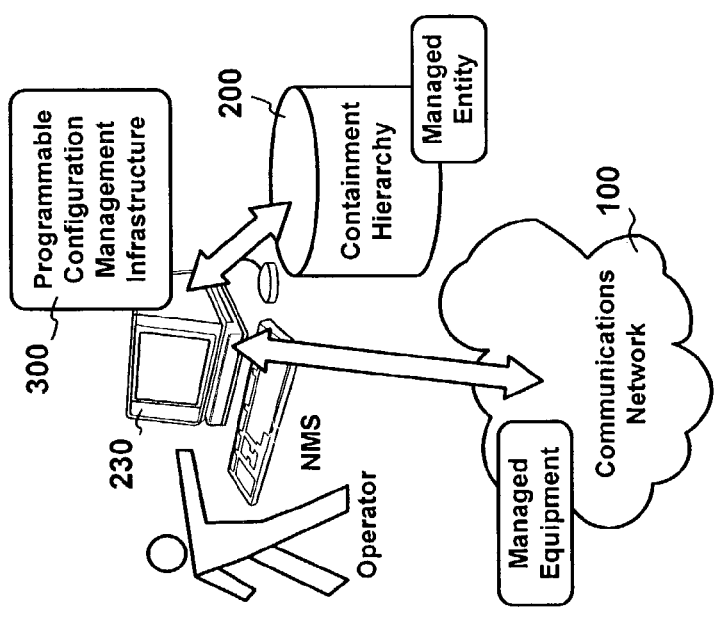
FIGS. 3A and B are schematic diagrams showing respectively a high level view and details of configuration management infrastructure components employed in a network management context to perform large scale communications network equipment configuration, in accordance with an exemplary embodiment of the invention.

In accordance with a preferred embodiment a programmable configuration management infrastructure 300 is employed in a network management context to perform large scale controlled configuration management, as schematically shown in FIGS. 3A & B. The configuration management infrastructure makes extensive use of services provided by a Network Management System (NMS) 230 and in particular makes use of "persistence" provisions. Each piece of communications network equipment has an associated group of parameters. These parameters either have an effect on the operation of the communications network equipment or label the communications network equipment. The "persistence" concept encompasses the storage of, access to, reading, writing, modifying, synchronization/reconciliation, etc. of persistence parameters to control the operation of communications network equipment.

Values of persistence parameters are held by corresponding managed network entity instances in the containment hierarchy 200 as well as in registers associated with the field-installed managed physical data network equipment in a communications network 100. Persistence reconciliation and synchronization is performed via: express managed communications network equipment configuration, alarm reporting received from the managed communications network equipment, scheduled updates, etc. ensuring a correct record keeping thereof.

Exemplary persistence access to, reading of, writing of, and modification of these parameters are described in, while the invention is not limited thereto, co-pending co-assigned U.S. patent applications: Ser. No. 10/021,080 entitled "Network Management System Architecture", and Ser. No. 10/115,900 entitled "Command Line Interface Processor", both of which are incorporated herein by reference.

Figure 3B:
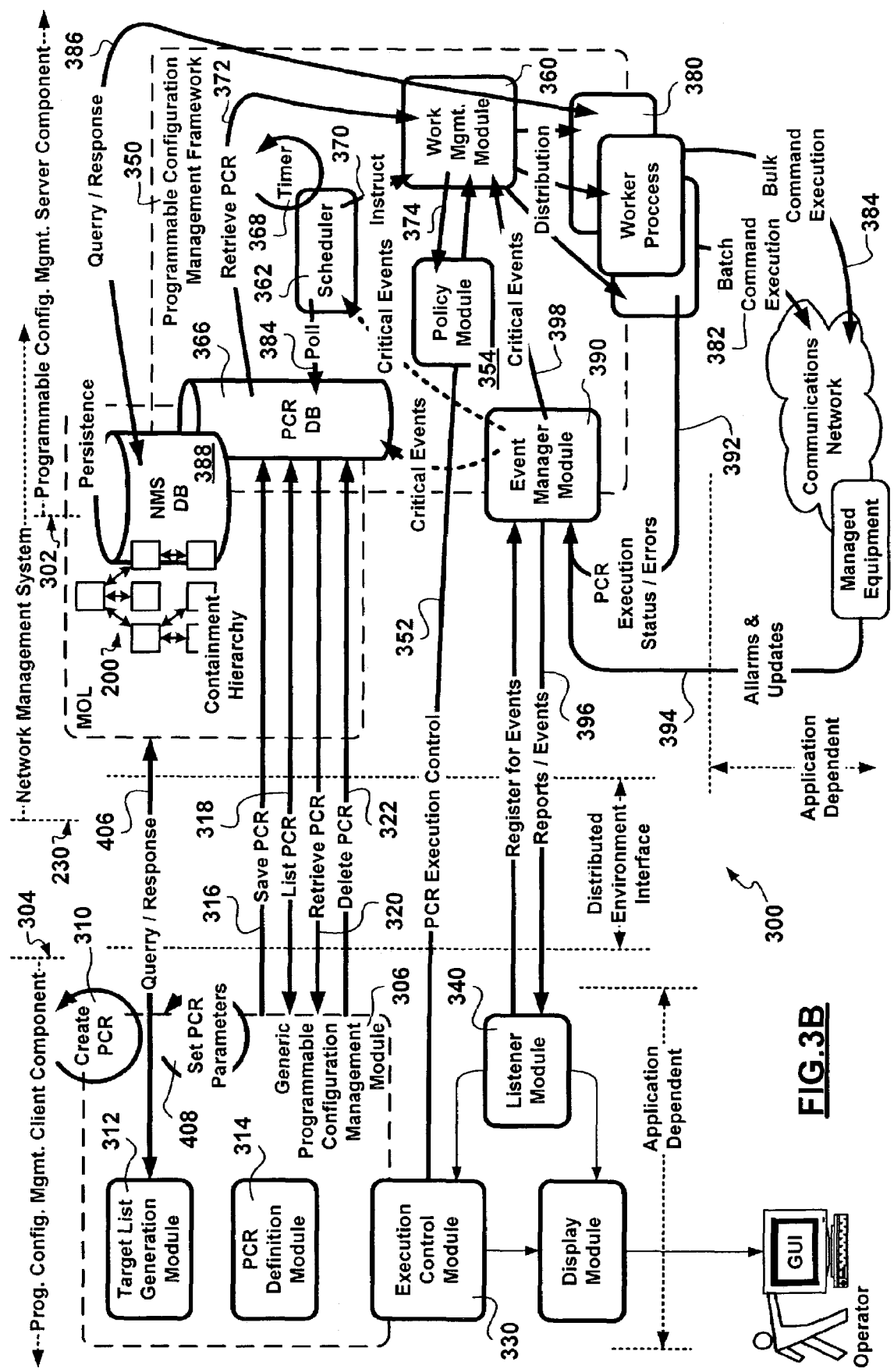

In accordance with the exemplary embodiment of the invention, the programmable configuration management infrastructure includes a central programmable configuration management server component 302 and at least one programmable configuration management client component 304. A multitude of programmable configuration management client components 304 are typically used and these include special purpose client components 304 designed for specific applications. Shown in FIG. 3B is a generic programmable configuration management module 306.

Figure 4:
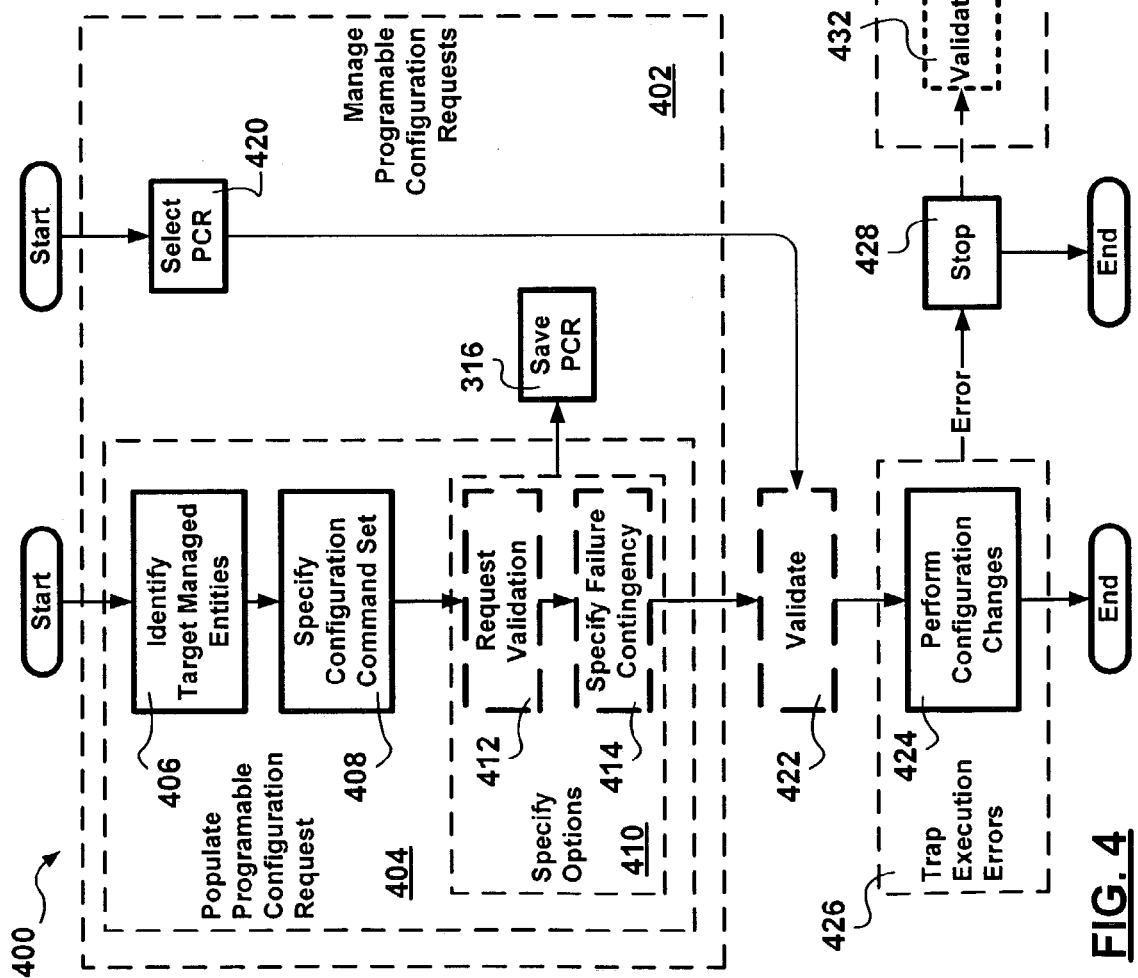
FIG. 4 is a flow diagram showing exemplary steps employed in effecting large scale configuration management, in accordance with the exemplary embodiment of the invention.

FIG. 4 is a schematic flow diagram showing exemplary steps of a generic configuration management process 400, in accordance with the exemplary embodiment of the invention.

In accordance with the exemplary embodiment of the invention, an operator interacts with the programmable configuration management module 306 to effect large scale configuration management via the manipulation 402 of at least one programmable configuration request.

Figure 5:
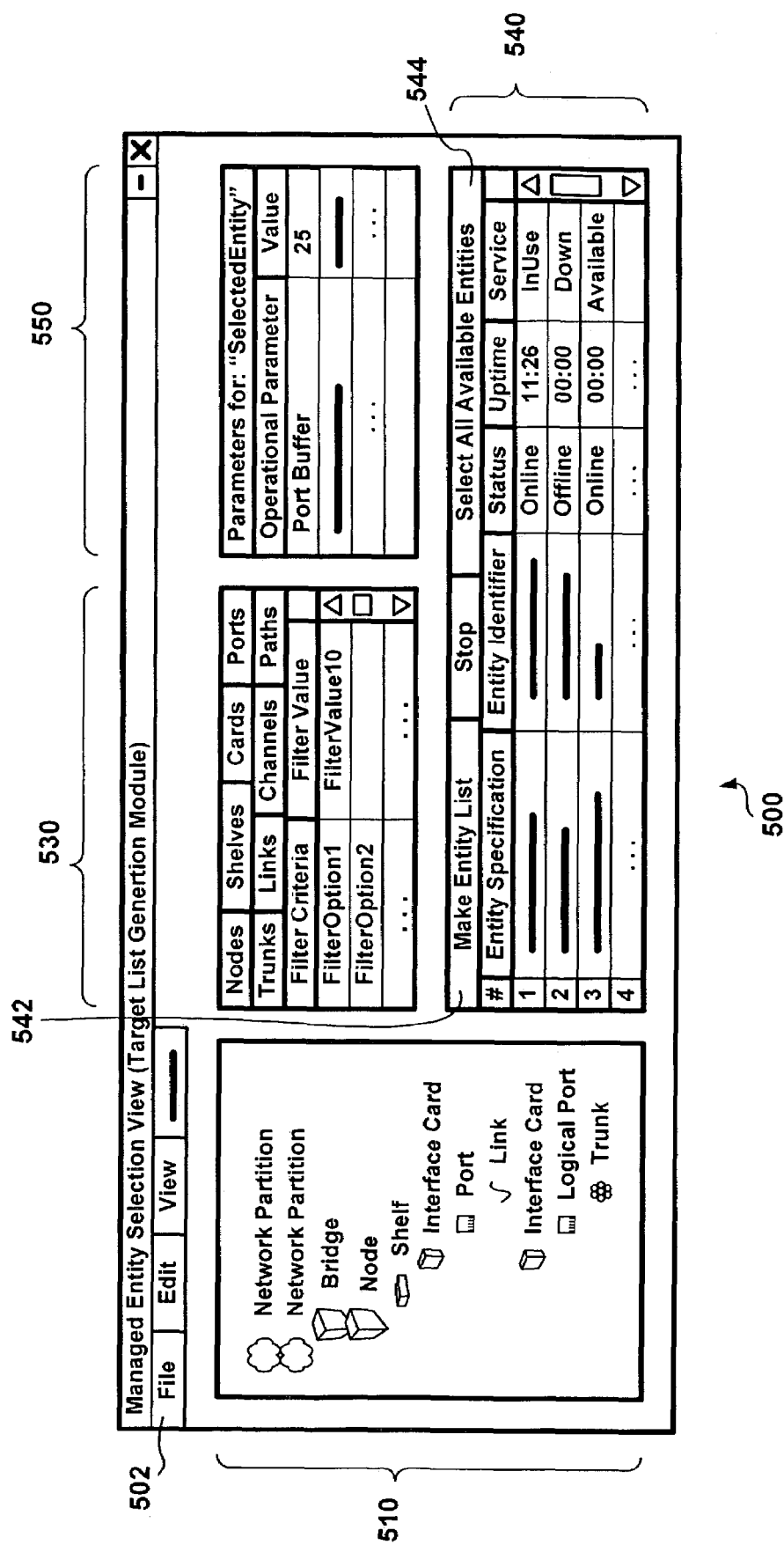
FIG. 5 is a schematic diagram showing an exemplary generic view of a human-machine interface used, in accordance with the exemplary embodiment of the invention, to select target communications network equipment to be configured.

FIG. 5, FIG. 6, and FIG. 7 show exemplary human machine interfaces used respectively in selecting target communications network equipment to be configured, setting parameters of programmable configuration requests, and to interact with the programmable configuration management infrastructure. Heretofore, when referring to the concepts presented the hundreds digit of the numbered labels corresponds to the figure number in which the embodiment of the concept presented is first introduced.

Using the generic programmable configuration management module 306, a programmable configuration request may be created 310. The operator interacts with the exemplary human-machine interface shown in FIG. 6 to do so. A Programmable Change Request (PCR) is a record specifying details of a configuration management job to be performed on a large group of communications network equipment. A PCR typically specifies a list of target network equipment to be configured, a configuration job, and scheduling information to perform the configuration job.

In order to populate 404 the created 310 PCR, the operator must generate the list of target network equipment to be configured. In the network management context the operator must identify 406 corresponding target managed entity instances held in the containment hierarchy 200 by interacting with a target list generation module 312. The target list generation module 312 may be implemented in a variety of ways, without limiting the invention thereto, including for example special purpose applications.

Now making reference to FIG. 5, the managed entity selection module 500 is such an exemplary target list generation module 312.

In accordance with the exemplary embodiment of the invention, functionality provided by a group of view panel components is combined to define the exemplary managed entity instance selection module having the exemplary user interface 500. The exemplary user interface module view panel 500 is presented. The managed entity selection module 500 combines functionality of a tree 510, filter 530, list 540 view panel components, and possibly that of a parameter inspection view panel component 550.

A "File" menu option 502 enables retrieval of a pre-prepared list of target entities for configuration. Once retrieved, the list of target entities is presented in the list view panel 540 as will be described herein below.

In identifying a group of target network equipment, the containment hierarchy 200, under NMS 230 management is displayed in the tree view panel 510, and may be navigated by interacting with the tree view panel 510. The selection of an entity of the displayed containment hierarchy 200 creates a selection context including all dependent containment hierarchy entities. Exemplary selection contexts include, but are not limited to: network partition, network node, shelf, interface card, port, link, trunk, channel, path, etc. The variety of selection contexts is only limited by the level of modeling provided for network management in the containment hierarchy 200.

The inclusion of dependent containment hierarchy entities in the selection context may further be refined via interaction with the filter view panel 530. Various combinations of filter criteria and perhaps filter values may be employed in: network node, shelf, interface card, port, trunk, link, channels, path, etc. configuration contexts activated, by interacting with same name tabs of the filter view panel 530, to discriminate between the managed entities in the containment hierarchy 200.

Validation of identified target entities is provided via the list view panel 540. A list of target entities may be displayed/refreshed by interacting with a "make list" button 542. The containment hierarchy 200, besides storing dependence relationships between managed entities, also stores managed entity specifiers holding identifiers and operational parameter values. In accordance with an exemplary implementation, all dependent branches of the containment hierarchy 200 in the selection context are traversed to extract a list of managed entity target references based on the filter criteria and filter values. The extracted list target entities is displayed in the list view panel 540.

Actual managed entity operational parameters (persistence) may be inspected, via the parameter view panel 550, by selecting individual managed entities via the tree view panel 510 and/or the list view panel 540.

If a list of target entities is retrieved (502) from a file, the list is displayed in the list view panel 540. A list of target entities displayed in the list view panel 540 may also be stored in a file via the "File" menu option 502.

By traversing the containment hierarchy 400 in a network management context; the intricacies of multi-vendor equipment are hidden to the operator. This enables novice personnel to operate the solution therefore reducing downtime.

The list results are provided, for example, as abbreviated managed entity records, perhaps including display fields for, but not limited to, managed entity: "specification", "identification", "provisioning status", "service provisioning", etc. Exemplary provisioning states include, but are not limited to: active "On Line" and inactive "Off Line" which represent a summary of overriding dependent entity statuses. The active "On Line" entities listed may further be categorized in accordance with service provisioning states including, but not limited to: "In Use" and "Available".

In order to effect expedient configuration changes, a "Select All Available Entities" button 544 may be interacted with to complete the target entity selection process.

Having identified 406 the target entities to be configured, populating the PCR 404 further includes setting PCR parameters 408. The operator interacts with a PCR specification view panel 600 associated with a PCR definition module 314 of the generic programmable configuration management module 306.

In populating the PCR 404, a configuration job must be specified 408. The operator interacts with the PCR specification view panel 600 to either select a configuration job or to specify a file holding a configuration job definition. The specification of the configuration job is beyond the scope of the present description and is dependent on a particular solution sought. Typically the configuration job includes a group of configuration commands to be executed on each target in the list, but the invention is not limited thereto.

Having specified the configuration job 408, populating the PCR 404 includes specifying PCR options 410.

Scheduling information may be entered including start and end times. The start and end specification format provides for date and time of day specifications. If the start time is left unspecified, then the PCR, once defined (and stored) is expected to take effect immediately. If the end time is left unspecified then the PCR is expected to take as long as it needs to complete processing unhindered.

Further the execution of the PCR may need to be performed repetitively at a frequency. The operator is provided with the option to specify the frequency in populating the PCR 404.

Policy information may also be specified. Although start and end times may be specified, when servicing PCRs in the network management context, it may not always be possible or desirable to comply with the start and end times, for example if the network infrastructure under management is experiencing a network failure, a lot of signaling bandwidth is being used up in restoring the network. A best time frame specification gives an indication as to when else the PCR may be run. For example, residential service user profiles should be changed between 09:00 to 17:00 on weekdays when the users are at work, and business service user profiles should be changed between 00:00 and 08:00 when businesses are closed. Policy information may also include the specification of a rate at which target entities are to be configured. Using too high a rate may overburden the network with a lot of signaling and configuration traffic. A minimum rate is typically specified to ensure that all targets are configured within a time window.

The configuration job may optionally be validated before it is performed on the target list. The operator is provided with the opportunity to request validation 412 of the configuration job and also to specify a validation job. The validation job specification is beyond the scope of the present description and is typically used to reduce the risk of erroneous configurations being performed.

A validation job may include a group of commands which may test a particular condition on the target entity without limiting the invention thereto. An exemplary test would include testing whether the target entity is activated but not in use so that configuration changes will not affect services currently provisioned. The validation job may include commands requesting that the current configuration of each target entity be saved and stored potentially to be used later if the configuration job fails.

The operator is further provided with the opportunity to specify what actions are to be taken in case errors are encountered during PCR execution (step 414). A first option enables the trapping of errors when performing configuration changes on the targets. The execution of the PCR may be stopped on detecting a first error. Stopping the PCR execution, as will be presented herein below, suppresses further configuration commands being sent to the next target in the list to be processed.

The configuration changes performed up to an including the detected error may be optionally undone to reverse the effect of undesired configuration changes. As will be presented herein below, PCR execution may involve sending configuration commands to multiple target entities in parallel, therefore it may be possible that although "Stop on First Error" option was selected, a few targets report configuration change errors. If the "Stop on Error" option was not selected, the configuration job is allowed to complete despite of encountered errors.

The programmable configuration management client component 304 includes a listener module 330 which registers with the programmable configuration management server component 302 to receive completion and error notifications on a per-PCR basis and on a per-target basis. The programmable configuration management infrastructure further keeps track of the targets processed so far, and the status of the configuration job performed on each target including encountered errors. Encountering errors in performing the configuration job is expected even if validation was successful. This is the case when a configuration change requires a resource to be available, the validation step finds the resource available but by the time the configuration job is to be run on the resource, the resource is in use.

The operator is provided with an option to request all configuration changes performed on all targets up to and including the targets reporting configuration errors to be undone, or only the configuration changes performed on the targets reporting configuration errors be undone.

The operator is further provided with facilities for the specification or selection of an undo job. The specification of the undo job is beyond the scope of the present description. Careful specification of the configuration job (or the validation job as mentioned above) may include saving the original configuration of the target entity before or at the beginning of the configuration job. The original configuration of the target entity may be stored in non-volatile storage at the field-installed communication network equipment itself or in off-board storage. The undo job may include commands to restore the saved configuration from non-volatile storage or to download the previous configuration stored off-board.

The operator is further provided with the option of employing an undo validation job and specify or select thereof. The specification of the undo validation job is beyond the scope of the present description. The necessity of the undo validation job may be appreciated from the fact that resources may be used immediately after a configuration attempt regardless whether the configuration attempt succeeded or not.

Yet further, the operator is provided with an option to enable the configuration job to be performed again and again if unsuccessful until success is achieved. It may be necessary to introduce a waiting period between attempts.

A created 310 and/or populated PCR may be saved 316 for later execution or modification. As shown in FIG. 7, the operator may interact with a PCR management view panel 700 presented by an execution control module 330. Saving 316 a PCR includes submitting the PCR to the programmable configuration management server component 302.

The PCR management view panel 700 includes a list view component 710 for listing a group of created PCRs. By interacting with a "List PCRs" button, a list of PCRs stored by the programmable configuration management server component 302 is provided 318. Each PCR is labeled with the user name of the operator who owns the PCR, ownership is automatic at creation or may be transferred by an administrator user. The received list of PCRs may be limited to generic and operator owned PCRs. The administrator user may request the listing of any and all PCRs available.

A PCR selected 420 from the PCR list 710 may be retrieved 320 by interacting with a "Retrieve PCR" button 320. Alternatively the selected PCR 420 may be deleted 322 by interacting with a "Delete PCR" button 322.

Having selected 420 a PCR populated 404 at least with a target list and a configuration job, the operator may actively effect configuration management on the target list. The overall status of the configuration management performed with respect to a particular PCR is shown in the PCR list 710 as:

"New" for a newly created PCR which does not have both the target list and at least the configuration job specified;

"In Progress" for a PCR in accordance with which targets are being configured;

"Success" for a PCR which has completed without encountering errors;

"Failed" for a PCR which has encountered errors but has not necessarily been stopped;

"Undo" for a PCR which has encountered errors and configuration changes are being restored;

"Validating" for a PCR in accordance with which targets are being validated prior to either configuration changes or configuration restoration;

etc.

Details of the execution of the configuration job in accordance with the PCR specification on a per-target basis is shown via a configuration job progress reporting list 720. The job progress list 720 displays for each target entity a target identification, a summary status, and perhaps start and end times. The PCR list 710 may also display scheduled start and end times for each PCR. On selecting a particular PCR from the list 710 entries in the job progress list 720 would show actual start and end times for each target entity. It may be possible that servicing of a PCR may lead to configuring targets at different times as will be presented below.

The operator may interact with a "Validate PCR" button 721 to begin the validation 422 of the configuration job. Each target entity in the job progress reporting list 720 initially displays "Validating". The validation may fail, succeed, or find the target unavailable with "Fail", "Success", "In Use" respective states being displayed. The reason for the failure may also be displayed either in the status field specifier or a separate field specifier. Feedback is provided via functionality of the listener module 340 mentioned above. Unavailable targets detected during validation may become available and the corresponding status thereof is changed to "Available" accordingly.

The operator may further interact with a "Start PCR" button 722 to begin performing configuration changes 424. Initially the status of each target displayed in the job progress list 720 is "In Progress". During the execution of the PCR, the status of each target changes to "In Use", "Success", or "Failed" as the configuration job is performed on each target entity. The configuration job execution status is reported regardless whether execution errors are trapped or not (426). The reason for the failure may also be displayed either in the status field specifier or a separate field specifier.

The operator may further interact with a "Stop PCR" button 724. Stopping 428 the execution of a PCR prevents the configuration job to be executed on the next and subsequent targets. Stopping (428) the execution of a selected PCR which has not been scheduled for servicing has the effect of not starting the PCR.

The execution of the PCR may be resumed by interacting with a "Resume PCR" button 726 which resumes executing the configuration job on the next and subsequent target entities. The scheduling information of a PCR may be modified at any time, however, the resumption of servicing a PCR will be subject to the new schedule specified.

Should the execution of a PCR be stopped 428 of due to an error, the operator may perform contingency PCR processing 430. By interacting with an "Undo" button 728, the operator may request the configuration of the target entities to be restored 434. If a PCR is selected from the PCR management list 710, then interacting with the undo button 728, the previous configurations are restored 434 in accordance with the PCR options specified (410)—for all previously processed target entities or only for target entities having experienced errors during the execution of the configuration job. If a target entity is selected from the job progress report list 720, then interacting with the undo button 728 the previous configuration of the target entity is restored 434 in accordance with the PCR specification.

Once the undo button 728 is pressed, the status of each target entity affected is set to "Undo". If validation of the undo job is specified, then the affected target entity status will display "Validating" temporarily as validation 432 takes place. The status of the affected target entities will eventually display "Success" or "Fail" dependent on the outcome of the undo job.

The listener module 340 further provides a visual execution status report via a progress bar 730. Once a target entity has been processed successfully the date and time at which the target entity was processed may also be displayed in the job progress list 720 (either in a separate column or by updating the start and end time specifications).

The solution makes use of NMS 230 functionality in configuring the selected target entities. In accordance with the exemplary embodiment of the invention, the programmable configuration management server component 302 includes a programmable configuration management framework 350 which implements configuration management functionality. All validate, start, stop, undo, resume, etc directives 352 issued by interaction with the respective buttons 720 though 728 are trapped by the programmable configuration management framework 350 and subjected to an internal policy module 354. The policy module 354 manages configuration management policies specifying configuration management windows and maximum rates at which targets are to be processed. The policy module 354 further enforces user authorization in issuing directives 352. Directives may be permitted to override policy restrictions. The directives are provided to a work management module 360.

In accordance with the exemplary embodiment of the invention, the programmable configuration management framework 350 may operate independently. A scheduler 362 inspects 364 a PCR database 366 storing PCRs. The inspection 364 of the PCR database 366 may be triggered by a timer 368, without limiting the invention thereto.

The scheduler 362 extracts scheduling information specified for each PCR. If no scheduling information is specified, then the work management module 360 is instructed 370 to service the PCR immediately. Otherwise if the scheduling information specifies a then current time value, then the work management module 360 is instructed 370 to service the PCR.

The work management module 360 either based on a directive 352 or instruction 370 from the scheduler 362, retrieves 372 the PCR.

During unattended operation of the work management module 360 interacts 374 with the policy module 354 to compare policy specifications. If a viable time window is not found then the status of the PCR is set to "Failed". If a viable time window in found then the PCR is set to be serviced starting as soon as possible within the viable time window. If the time window does not include the current time then the servicing of the PCR is delayed until the start of the viable time window.

In servicing the PCR the work management module 360 delegates PCR servicing to at least one worker process 380. Based on the PCR options specified 410, policies managed by the policy module 354, and the viable time window, a multitude of worker processes 380 may be employed each of which processes target entities at a run time determined target processing rate. As such a worker process 380 processes target entities serially 382 while multiple worker processes 380 process target entities in parallel 384 to provide controlled large scale configuration management. Whether target entities may be processed in parallel and the degree of pallalelism may be specified via policies enforced by the policy module 354, but the invention is not limited thereto. Optionally, the PCR specification may include parallel processing specifiers.

It may be possible that a viable time window can be found while policies in force impose a slow rate of target processing and serial target processing. The combination results in an inability to service a PCR in its entirety during a viable time window. Such a started PCR will process as many target entities as possible during the viable time window and will be stopped and rescheduled for continued execution during a subsequent viable time window.

An event manager module 390 provided by the network management system 230, receives PCR status reports and PCR execution errors 392 from the worker processes 380. As configuration management is effected on target field-installed managed communications network equipment, the target field-installed communications network equipment reports 394 alarm information and updates to the event management module 390. The event manager module 390 reports 396 events to the listener module 340 registered to receive the events on a PCR basis or a target entity basis. Critical events are reported 398 at least to the work management module 360 to enable the suppress 428 processing further targets and to initiate contingency processing 430.

The work management module 360 and the worker processes 380 query 386 a network management database 388 and receive responses 386 in tailoring configuration, validation, undo, and validation undo jobs for each particular target entity. The network management database 388 is associated with a Managed Object Layer (MOL) providing managed network entity modeling.

In accordance with an exemplary implementation, the containment hierarchy 200 is associated with the network management database 388 in which it is stored. Therefore in interacting with the managed entity selection panel 500 to generate 312 a target list, the identification 406 of managed target entities includes querying the network management database 388.

In accordance with another exemplary implementation, the PCR database 366 may share storage space and may be integral with the network management database 388.

The NMSs 230, such as the Alcatel 5620 NMS provide persistence functionality as mentioned above. In accordance with another implementation of the invention, the worker processes 380 issue configuration change requests 386 to the network management database 388 and the persistence functionality provided via the managed object layer propagates the configuration changes to the filed-installed communications network equipment enabling a high level specification of configuration, validation, undo, and undo validation jobs. Therefore the actual commands sent to each target entity for configuration thereof may differ from target entity to target entity in support of multi-vendor equipment and different equipment types. More details are provided in the above mentioned co-pending US patent applications mentioned above.

In accordance with a further implementation of the invention, the event manager module 390 may monitor the network management database 388 directly for configuration changes.

The embodiments presented are exemplary only and persons skilled in the art would appreciate that variations to the above described embodiments may be made without departing from the spirit of the invention. The scope of the invention is solely defined by the appended claims.

We claim:

1. A programmable configuration management framework comprising:
   a. a store for retrievably storing a plurality of programmable configuration requests;
   b. a scheduler inspecting the store to identify at least one programmable configuration request to be serviced;
   c. a work management module, responsive to the scheduler, servicing the identified programmable configuration request causing a corresponding plurality of configuration commands to be issued for monitored execution to a plurality of communications network target entities; and
   d. an event management module receiving command execution feedback and informing the work management module of reported events, the work management module performing contingency processing in accordance with a corresponding programmable configuration request specification.

2. The programmable configuration management framework as claimed in claim 1, wherein the scheduler is further responsive to a timer, the scheduler polling the store and identifying the at least one programmable configuration request.

3. The programmable configuration management framework as claimed in claim 1, wherein the work management module is further responsive to a policy module, the policy module enabling engineered configuration management controlling the issuing of the plurality of configuration commands to prevent the overuse of bandwidth in a realm of management.

4. The programmable configuration management framework as claimed in claim 1, wherein the event management module further exchanges information with a human-machine interface to enable the display of a current progress in servicing the at least one programmable configuration request being serviced.

* * * * *